United States Patent
Gerlitz et al.

(10) Patent No.: US 12,092,516 B2
(45) Date of Patent: Sep. 17, 2024

(54) SENSOR APPARATUS FOR DETECTING THE WETNESS OF A WINDOW, PARTICULARLY THE WINDOW OF A MOTOR VEHICLE

(71) Applicant: HELLA GmbH & Co. KGaA, Lippstadt (DE)

(72) Inventors: Viktor Gerlitz, Oldenburg (DE); Thomas Niemann, Delmenhorst (DE); Dirk Jegminat, Bremen (DE); Alexander Göhmann, Lahnau (DE)

(73) Assignee: HELLA GMBH & CO., KGAA, Lippstadt (DE)

( * ) Notice: Subject to any disclaimer, the term of this patent is extended or adjusted under 35 U.S.C. 154(b) by 258 days.

(21) Appl. No.: 17/719,814

(22) Filed: Apr. 13, 2022

(65) Prior Publication Data
US 2022/0333980 A1     Oct. 20, 2022

(30) Foreign Application Priority Data

Apr. 14, 2021 (DE) ...................... 10 2021 109 380.5
Feb. 10, 2022 (DE) ...................... 10 2022 103 101.2

(51) Int. Cl.
    *G01J 1/42*        (2006.01)
    *G01N 21/3554*    (2014.01)
    (Continued)

(52) U.S. Cl.
    CPC ............ *G01J 1/42* (2013.01); *G01N 21/3554* (2013.01); *G02B 3/0068* (2013.01); *B60S 1/0837* (2013.01)

(58) Field of Classification Search
    CPC .......... G01J 1/42; G01J 1/0407; G01J 1/0411; G01N 21/3554; G01N 21/552;
    (Continued)

(56) References Cited

U.S. PATENT DOCUMENTS

| | | | |
|---|---|---|---|
| 6,429,933 B1 * | 8/2002 | Jackson, Jr. .......... | B60S 1/0822 356/239.8 |
| 6,507,015 B1 * | 1/2003 | Maeno ................... | G01N 21/43 340/602 |

(Continued)

FOREIGN PATENT DOCUMENTS

| | | |
|---|---|---|
| DE | 19830120 A1 | 2/1999 |
| DE | 19933641 A1 | 3/2001 |

(Continued)

*Primary Examiner* — Abdullahi Nur
(74) *Attorney, Agent, or Firm* — MUNCY, GEISSLER, OLDS & LOWE, P.C.

(57) ABSTRACT

A sensor apparatus for detecting the wetness of window, with a radiation emitter and a radiation receiver, with an optical guide element which can be coupled to the inner side of the window, the radiation inlet side and the radiation outlet side of the guide element are each embodied as a lens arrangement, and a lens arrangement is embodied by lens contours arranged side by side. The lens arrangement on the radiation inlet side has at least two lens contours. The inlet surfaces of the lens contours on the radiation inlet side, through which the radiation is able to enter the guide element, are inclined towards each other. The lens arrangement on the radiation outlet side has at least two lens contours. The outlet surfaces of the lens contours on the radiation outlet side, through which the radiation can exit the guide element, are inclined towards each other.

15 Claims, 3 Drawing Sheets

Figure 1:
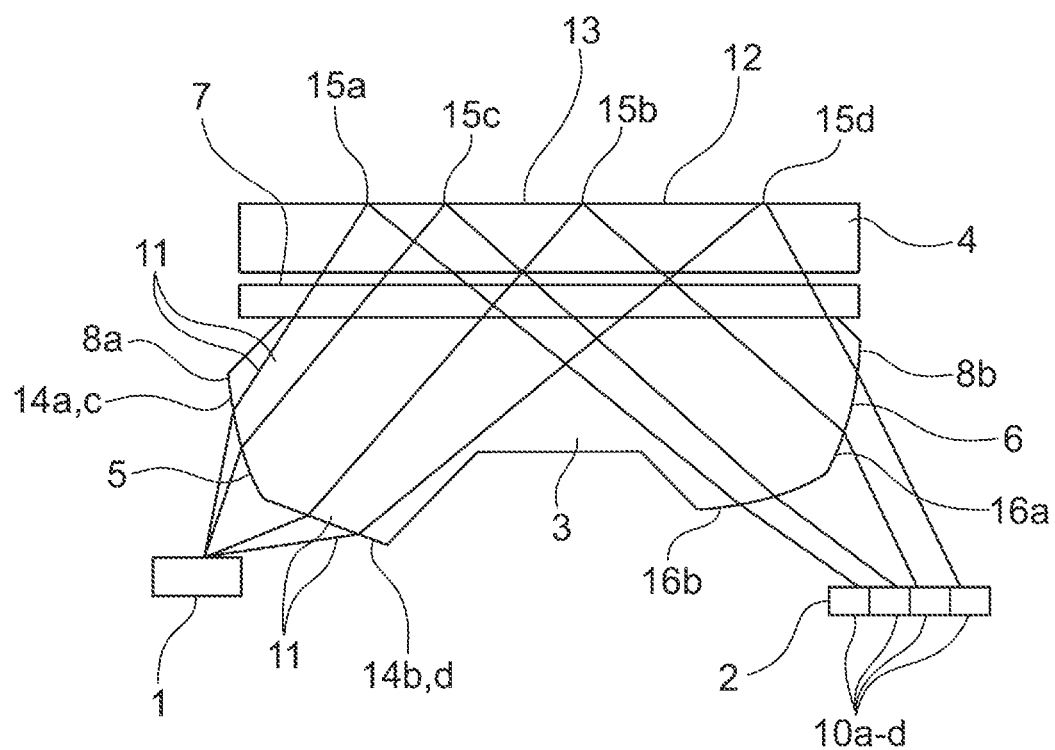

(51) Int. Cl.
   *G02B 3/00*   (2006.01)
   *B60S 1/08*   (2006.01)
(58) Field of Classification Search
   CPC ...... G01N 21/94; G01N 21/55; G02B 3/0068;
                    G02B 27/0006; B60S 1/0837
   See application file for complete search history.

(56) References Cited

U.S. PATENT DOCUMENTS

| | | | | | |
|---|---|---|---|---|---|
| 6,954,047 | B2 * | 10/2005 | Neubauer | ............ | B60S 1/0822 |
| | | | | | 318/483 |
| 7,751,054 | B2 * | 7/2010 | Backes | ................ | B60S 1/0822 |
| | | | | | 250/227.24 |
| 9,845,073 | B2 * | 12/2017 | Gohmann | ............ | G01N 21/552 |
| 2003/0156291 | A1 * | 8/2003 | Tsunetomo | ........... | B60S 1/0822 |
| | | | | | 356/445 |
| 2006/0043322 | A1 * | 3/2006 | Ishikawa | ............... | B60S 1/0837 |
| | | | | | 250/573 |
| 2006/0076524 | A1 * | 4/2006 | Yoshigoe | ............. | G01N 21/552 |
| | | | | | 250/573 |
| 2006/0215164 | A1 * | 9/2006 | Takata | ................ | G01N 21/552 |
| | | | | | 356/445 |
| 2007/0114369 | A1 * | 5/2007 | Tarui | .................... | G01N 21/274 |
| | | | | | 250/227.25 |
| 2008/0116379 | A1 * | 5/2008 | Teder | ................... | B60S 1/0822 |
| | | | | | 250/221 |

FOREIGN PATENT DOCUMENTS

| | | |
|---|---|---|
| DE | 102005041588 A1 | 1/2007 |
| DE | 102019121567 A1 | 2/2021 |

\* cited by examiner

SENSOR APPARATUS FOR DETECTING THE WETNESS OF A WINDOW, PARTICULARLY THE WINDOW OF A MOTOR VEHICLE

The invention relates to a sensor apparatus for detecting the wetness of a window, particularly the window of a motor vehicle, with at least one radiation emitter for emitting radiation and with at least one radiation receiver for receiving radiation, with at least one optical guide element which can be coupled to the inner side of the window for guiding the radiation emitted by the radiation emitter, wherein at least one radiation inlet side of the guide element is assigned to the at least one radiation emitter, and at least one radiation outlet side of the guide element is assigned to the at least one radiation receiver, wherein the radiation inlet side and die radiation outlet side of the guide element are each embodied as a lens arrangement, and wherein at least one lens arrangement is created by lens contours arranged side by side.

Sensor apparatuses for detecting the degree of wetness, for example detecting precipitation on a window, particularly on a windscreen, are used in very many motor vehicles. In these situations, the corresponding sensor devices are usually positioned in the top region of the windscreen so that they can determine the degree of wetness on the windscreen there. In order to detect the degree of wetness, an optical sensor apparatus may be used, for example, in which for example a radiation signal, particularly an infrared signal, is coupled into the windscreen, and then coupled out again after the radiation has traversed a track in the windscreen. It is possible to determine the percentage of total internal reflections in the windscreen on the basis of the percentage of the radiation that is coupled out again. In this process, the percentage of total internal reflections in der windscreen is influenced by the wetness of the windscreen, with water, for example. In particular, the percentage of total internal reflections in the windscreen is reduced by the wetness with water, as radiation can be coupled out through the wetted regions.

A sensor device for detecting the degree of wetness and/or soiling on a window fitted on a motor vehicle is known from DE 199 55 423 A1 for example. Here, individual optical guide elements, separated from each other by a blocking element, are formed on a wall of a housing to reduce the amount of ambient radiation entering from the environment. The sensor device has a radiation emitter and a radiation receiver, which are arranged on a circuit board as SMD components.

Sensor devices known from the related art are structured in such a way that they do not make it possible to differentiate the size and position of water drops within the rain detection surface, since sensitivity may be distributed unevenly over the detection surface.

The object underlying the invention is to suggest a sensor apparatus of the type described in the introduction, which enable the position and size of raindrops on the detection surface to be determined.

This object is solved with a sensor apparatus having the features of claim 1, with a motor vehicle having the features of claim 14, and with a method having the features of claim 15. Advantageous variants of the invention are described in the subordinate claims.

In a sensor apparatus for detecting the wetness of a window, particularly the window of a motor vehicle, having at least one radiation emitter for emitting radiation and having at least one radiation receiver for receiving radiation, having at least one optical guide element which can be coupled into the inner side of the window for guiding the radiation emitted by the radiation emitter, wherein at least one radiation inlet side of the guide element is assigned to the at least one radiation emitter and at least one radiation outlet side of the guide element is assigned to the at least one radiation receiver, wherein the radiation inlet side and the radiation outlet side of the guide element are each embodied as a lens arrangement, and wherein at least one lens arrangement is formed by lens contours arranged side by side, it is provided as essential to the invention that the lens arrangement of the radiation inlet side has at least two lens contours, that the inlet surfaces of the lens contours of the radiation inlet side, through which the radiation is able to enter the guide element, are inclined towards each other, that the lens arrangement of the radiation outlet side has at least two lens contours, and that the outlet surfaces of the lens contours of the radiation outlet side, through which the radiation can exit the guide element, are inclined towards each other.

The sensor apparatus is constructed to enable it to be arranged on the inner side of a window, particularly on the windscreen of a motor vehicle. The sensor apparatus has at least one radiation emitter for emitting radiation, particularly electromagnetic radiation, for example infrared radiation. The radiation emitter may be designed as a LED, for example. The radiation emitter may serve to emit electromagnetic radiation, which may be coupled into the windscreen, in which the electromagnetic radiation may traverse a measuring section through total internal reflections on the sides of the window pane. At the end of the measuring section, the electromagnetic radiation may exit the windscreen, that is to say it may be coupled out, and be detected by at least one radiation receiver. Raindrops on the windscreen for example may have the effect of reducing the percentage of total internal reflections of the electromagnetic radiation in the windscreen, so that the electromagnetic radiation is coupled out at these places. In order to couple the electromagnetic radiation into and out of the windscreen, the sensor apparatus includes at least one optical guide element, which may be designed as a glass body or a plastic body or similar, for example, particularly a transparent body. In particular, the optical guide element is transparent for infrared radiation. In this context, an optical guide element may be assigned to the radiation emitter, and an optical guide element may be assigned to the radiation receiver, preferably a shared optical guide element is assigned to the radiation emitter and the radiation receiver. In particular, an optical guide element may have a radiation inlet side coupling the radiation emitted by the radiation emitter into the guide element and/or a radiation outlet side for coupling the emitted radiation out of the guide element. In such an arrangement, the radiation inlet side is assigned to the radiation emitter, the radiation outlet side is assigned to the radiation receiver. One guide element also has a surface facing the window for coupling the electromagnetic radiation into and/or out of the window. The radiation inlet side and the radiation outlet side of the guide element may be arranged at an acute angle to the plane of the window, so that a total internal reflection of the radiation emitted by the radiation emitter can take place in der window, particularly on the outward facing side of the window, that is to say on the side of the window facing away from the guide element, for example on the side facing away from the interior in a motor vehicle windscreen. The radiation outlet side may also be positioned at an acute angle to the window, for example, so that the radiation that has undergone total internal reflection in the window and has been coupled out of the window is able to reach the radiation receiver from the radiation outlet side. The radiation emitter may be a light source, for example, particularly a LED, by which the radiation is emitted. The radiation is coupled into the windscreen via the guide element, and after at least one total internal reflection the radiation may be coupled out of the windscreen again on the outer side of the window, that is to say on the side of the window facing away from the guide element. The radiation inlet side and the radiation outlet side may be designed as a lens arrangement with multiple lens contours. In particular, the lens contours may be designed as converging lenses, that is to say as lenses with a convex curvature in each case. The radiation emitted by the radiation emitter may be widened inside the guide element by the lens arrangement on the radiation inlet side in order to direct the radiation onto the largest possible region of the windscreen. The detection region of the sensor apparatus is defined by the area that is irradiated with radiation. The radiation that is coupled out of the windscreen may be focussed on different regions of the radiation receiver by the lens arrangement on the radiation outlet side. For this purpose, for example the radiation receiver may include multiple sensorially active regions arranged side by side, a plurality of photodiodes, for example, on which the radiation that is coupled out is focussed in each case by lens contours. In this way, the radiation that is coupled out from various areas of the detection region may be evaluated by different sensorially active regions of the radiation receiver. For example, if the radiation outlet side of a guide element is designed as a single converging lens, the focussing of the radiation on the central region of a single photodiode of a radiation receiver, the sensitivity of the photodiode may diminish progressively from the centre to the edges thereof. The use of a radiation receiver with multiple sensorially active regions and focussing of the radiation that is coupled out of the window on the individual sensorially active regions by multiple lens contours has the effect of enabling even distribution of radiation-sensitivity over the entire area of the radiation receiver. The radiation-sensitivity of the radiation receiver with multiple sensorially active regions may also be enhanced compared to a radiation receiver with just one sensorially active region. In particular, the statistical plausibility of the measurements is increased when they are captured by a plurality of substantially independent regions. The detection region on the window is formed by the area of the window in which total internal reflections of the coupled-in radiation can occur, that is to say by the measuring section. This region can be enlarged by widening of the radiation through the lens contours of the radiation inlet side. Thus for example the position of a raindrop on the window, or its size as well, may be determined in the detection region, because in the regions in which the raindrop is located radiation is coupled out of the windscreen and consequently is not reflected towards the radiation receiver. By these regions, radiation is reflected with a lower with radiation intensity and directed onto the radiation receiver.

The lens arrangements are formed by lens contours that are arranged side by side. The radiation inlet side and the radiation outlet side may include a lens arrangement consisting of lens contours arranged side by side. The lens arrangement of the radiation inlet side includes at least two, preferably four, lens contours, wherein the inlet surfaces— i.e. the surfaces through which the radiation from the radiation source is able to enter the guide element—of the two lens contours are inclined towards. In this way, there is not a continuous transition between the lens contours, instead the lens contours are tilted towards one another. The lens contours may be arranged in a grid of 2×2 lens contours. All of the lens contours are convex, that is to say they are designed as converging lenses. The lens contours are preferably connected by a shared lens body. The different lens contours offer individual inlet surfaces by which the radiation can enter the lens medium, that is to say the guide element. In this way, the radiation emitted from a radiation source, such as a LED, is split into beam bundles. Thus, the four different lens contours have the effect of splitting the input beam into four separate beam bundles. However, the individual beam bundles may overlap. The split beam bundles, i.e. the light which has entered and been refracted at each quadrant, are each directed through the guide element substantially separately from each other to the outer surface of the windscreen, in such manner that from the beam bundles are created four illumination surfaces that are substantially separate from each other apart from overlap regions at the sides. The radiation is coupled into the windscreen at the illumination surface. After total internal reflection on the outer surface of the windscreen, the beam bundles are focussed by the convex lens contours of the outlet side on a photosensitive surface of a radiation receiver provided for the respective beam bundle, particularly a multi-field detector. For this purpose, the radiation outlet side consists of two separate optical lens contours, wherein the outlet surfaces from the lens medium, that is to say from the guide element, are inclined a few degrees towards each other to enable the radiation bundling. The two lens contours are connected to form a common lens body.

Thus, the optical lens contours of the radiation inlet side cooperate to form a number of illumination surfaces, which together form the detection surface. Wetting of the window with a liquid causes one or more illumination surfaces to become covered, and consequently a certain quantity of light is coupled out. This in turn causes the signal intensity to vary in the respective quadrant of the radiation receiver, and the signal change is registered by the evaluation electronics. Depending on the degree of coverage of the individual illumination surfaces or the combined total thereof, the measured intensities in all quadrants of the multi-field detector are always different at any given time. This makes it possible to classify the nature of the wetness. In contrast to a single focus point, which represents the entire detection surface in the windscreen, the focus points created by the individual beam bundles can be evaluated separately from each other. For example, the side by side arrangement of the lens contours enables the radiation coupled into the guide element to be focussed on different regions of the window, i.e. different regions of the detection surface, and radiation that is coupled out of the window can be focussed on different regions of the radiation receiver upon exiting at the radiation outlet side. In this way, spatially separate monitoring of different regions of the detection surface is enabled.

The lens contours of the lens arrangement may be arranged in a grid. The different lens contours of a lens arrangement may be arranged side by side in a grid, particularly in rows and columns. In particular, this may be a rectangular grid, in which all columns or all rows have the same number of lens contours. For example, the lens arrangement may be created by arranging 1×2, 2×2, 3×3, 4×4 or 5×5 lenses. Thus for example, two lens contours may be arranged side by side in each row and two lens contours may be arranged in each column of the grid.

In a further development of the invention, at least a portion of the lens contours is designed in the form of converging lenses. The various lens contours of the radiation inlet side and of the radiation outlet side are realised as convex, particularly as plano-convex converging lenses. The convex bulge of the lens contours is curved towards the light source on the radiation inlet side, and towards the radiation detector on the radiation outlet side. The structure as converging lenses means that the radiation originating from the radiation emitter is widened in order to reach a larger detection area on the windscreen. The lens contours may be constructed as converging lenses on the one-piece guide element, wherein the guide element may include a flat contact surface for mounting on the window that is to be monitored. The convex structure of the lens contours enables the radiation originating from the radiation source to be focussed on different illumination surfaces on the windscreen that form the detection region. When the radiation exits the guide element, the beam bundles may be detected on different regions of the multi-field detector so that they can be evaluated independently, wherein it is also possible that the regions may overlap.

In a further development of the invention, the lens arrangement of the radiation inlet side has at least four, particularly exactly four lens contours, and the inlet surfaces of the lens contours are inclined towards each other. The radiation inlet side, through which the radiation from the radiation source is coupled into the guide element, includes at least four lens contours. The lens contours are preferably designed as convex converging lenses. The lens contours, particularly the inlet surfaces thereof, are inclined towards each other. The radiation passes into the lens medium of the guide element via the inlet surfaces. The inlet surfaces are inclined towards each other in such a way that the radiation from the radiation source is refracted and consequently split up into a radiation bundle by each lens contour. The inlet surfaces of the lens contours are preferably inclined towards each other by a few degrees, particularly 0.5° to 5°. The inclination of the lens contours towards each other means that the inlet surfaces of the lens contours each form an angle with each other, so the transition between them is not unbroken. This enables the emitted radiation to be separated into sub-bundles, so that the windscreen can be illuminated in several sub-bundles, wherein overlap regions may be created between the sub-bundles. This in turn makes it possible to evaluate the sub-bundles substantially separately from each other.

In a further development of the invention, the lens arrangement of the radiation inlet side and of the radiation outlet side each form at least one tier, and at least one lens contour is located on both sides of each tier. The radiation inlet side and the radiation outlet side preferably each form exactly one tier. Two lens contours are preferably arranged on each side of the tier. With the formation of a tier between the lens contours of the incoming and/or outgoing beam bundles can be split further still, which in turn improves their spatial separation.

In one embodiment of the invention, on the radiation inlet side two lens contours are arranged on a first side of the tier and two lens contours are arranged on the second side of the tier. In order to further support the beam splitting of the radiation emitted by the radiation source, a tier is arranged is between two first lens contours and two second lens contours. The lens contours may be arranged in a 2×2 grid for this purpose.

In one embodiment of the invention, one tier is arranged parallel to the direction of radiation of the radiation which is guided by the guide element, and one tier is arranged transversely to the direction of radiation of the radiation which is guided by the guide element. The structure and alignment of the tiers enables effective beam splitting and effective focussing on the radiation receiver. In particular, the tiers on the radiation inlet side and on the radiation outlet side are aligned perpendicularly to each other. For example, the notional planes described by the tiers may form a right angle with each other.

In one embodiment of the invention, the tier formed on the radiation inlet side is arranged transversely to the radiation that is directed through the guide element, and the tier formed on the radiation outlet side is arranged parallel to the radiation that is directed through the guide element. In particular, the tier on the radiation outlet side is aligned substantially parallel to the lengthwise extension of the measuring section between the radiation inlet side and the radiation outlet side. The tier on the radiation inlet side is arranged transversely, substantially perpendicularly to the lengthwise extension of the measuring section. The tier on the radiation inlet side enables effective splitting of the radiation emitted by the radiation source. The structure of the tier in the radiation outlet side enables the radiation that has been split into sub-bundles to be focussed efficiently on the multi-detector with low losses.

In a refinement of the invention, at least one lens arrangement of at least ones guide element is designed as a single part. A lens arrangement on the radiation inlet side or the radiation outlet side of a guide element may be constructed integrally with the guide element. For example, the lens contours may be formed by a structuring of the radiation inlet surface and/or the radiation outlet surface of the guide element.

In a refinement of the invention, a shared optical guide element is assigned to at least one radiation emitter and at least one radiation receiver. The optical guide element with a radiation inlet side assigned to the radiation emitter and a radiation outlet side assigned to the radiation receiver may be constructed as a single part. In such a case, the guide element has a contact surface for mounting on the window through which the optical radiation from them radiation emitter may be coupled into the window and after total internal reflection in the window coupled out again in the direction of the radiation receiver. The guide element also has a radiation inlet side assigned to the radiation emitter and a radiation inlet side assigned to the radiation receiver.

In one embodiment of the invention, different optical guide elements are assigned to at least one radiation emitter and at least one radiation receiver. One optical guide element each may be assigned to the radiation emitter and the radiation receiver, wherein the guide element assigned to the radiation emitter has a radiation inlet side, and the guide element assigned to the radiation receiver has a radiation outlet side. Each of the guide elements assigned to the radiation emitter and the radiation receiver has a contact surface to allow mounting on the window, particularly on the windscreen. The contact surface functions to couple the radiation into the windscreen for the guide element assigned to the radiation emitter, while for the guide element assigned to the radiation receiver the radiation may be coupled out of the windscreen and into the guide element via the contact surface.

In one embodiment of the invention, the radiation receiver assigned to the radiation outlet side is designed as an assembly of sensorially active regions. In particular, the radiation receiver may be an assembly of photodiodes. Alternatively, the radiation receiver may also have a pixel array, for example, with which the individual radiation bundles that reach the radiation receiver can be detected. In particular, a sensorially active region may be assigned to each lens contour of the lens arrangement on the radiation inlet side, so that the different radiation bundles which are focussed by the lens contours, can be detected substantially independently of each other except for overlap regions. This makes it possible for position and size of a water drop for example to be detected on the detection region.

In a refinement of the invention, the number and arrangement of the sensorially active regions of the radiation receiver match the number and arrangement of the lenses in the lens arrangement of the radiation inlet side. In particular, a sensorially active region, a photodiode for example, may be assigned to each lens contour of the lens arrangement of the radiation inlet side. Thus in particular, the four lens contours of the radiation inlet side may correspond to four sensorially active regions. This enables separate monitoring of the different regions formed by the various lenses.

In one embodiment of the invention, the radiation inlet side of a guide element has a lens arrangement, and the assigned radiation emitter is constructed as an assembly of radiation sources. The radiation emitter may be formed for example by an assembly of light sources, particularly LEDs. A radiation inlet side of the guide element is assigned to the radiation emitter, wherein the radiation inlet side is formed from a lens arrangement. The assignment of individual radiation sources to individual lens contours of the lens arrangement enables selective focussing of the radiation on specific regions of the windscreen. This then enables rastered detection of the various regions of the detection surface. The radiation outlet side of the guide element may be constructed for example as a converging lens which is focussed on a sensorially active region of a radiation receiver, for example a photodiode.

The invention further relates to a motor vehicle having a sensor apparatus according to the invention. Sensor apparatuses for detecting the degree of wetness on the windscreen may be used particularly on motor vehicles to detect rain. With a radiation inlet side or a radiation outlet side of a guide element formed by a lens arrangement, it is possible to detect the size and position of a raindrop in the detection region of the windscreen. This turn enables the degree of wetness of the entire windscreen to be determined more accurately.

The invention relates further to a method for detecting the degree of wetness of a window, particularly a window of a motor vehicle, with a sensor apparatus according to any one of claims 1 to 13, wherein radiation is emitted by at least one radiation emitter, wherein the emitted radiation is split into beam sub-bundles and coupled into a guide element via least two, particularly four, lens contours inclined towards each other on a radiation inlet side of the guide element, wherein the radiation is coupled into the window by means of the guide element, wherein after total internal reflection in the window the radiation is coupled into the guide element again, wherein the radiation reflected in the window is directed onto at least one radiation receiver via at least two, particularly exactly two, lens contours inclined towards each other on a radiation outlet side of the guide element, wherein the radiation receiver has several, particularly four, sensorially active regions, and wherein beam bundles reflected from various regions of the window are each detected by means of the various sensorially active regions of the radiation receiver.

Radiation, particularly electromagnetic radiation, for example infrared radiation, may be emitted by at least one radiation emitter and coupled into a window that is to be monitored by at least one guide element. In this process, the radiation is coupled into the windscreen at such an angle that total internal reflections of the radiation will occur in the window. In particular, the radiation is reflected on the side of the window farthest from the radiation receiver. When the window is exposed to moisture, particularly drops of water, total internal reflection in the window may be obstructed, since the radiation can be coupled out of the window at the places where the water drops are located. A comparison of the totally reflected radiation and the partially totally reflected radiation may allow a determination to be made regarding the degree of wetness of the windscreen. In particular, a detection surface on the window may be defined by the regions in which total internal reflections can occur. The sensor apparatus for carrying out the method includes at least one radiation receiver which has multiple sensorially active regions. The sensorially active regions may be photodiodes, for example. At least one radiation receiver is assigned to the optical guide element, wherein the radiation inlet side and die radiation outlet side of the guide element is formed by a lens arrangement with different lens contours. In this context, a lens contour of the radiation inlet side is assigned to each sensorially active region of the radiation receiver. The radiation emitted by the radiation source is split into sub-beam bundles by the different lens contours of the radiation inlet side. The sub-beam bundles may partially overlap. This creates a detection surface on the window, consisting of individual radiation focus points, wherein there may be lateral overlap between adjacent focus points. The radiation reflected in the detection area is coupled into the guide element again and focussed from the radiation outlet side onto the radiation receiver with its various sensorially active regions, the number of which is preferably adjusted to match the number of lens contours on the radiation inlet side. Each radiation sub-bundle is substantially focussed on a sensorially active region. In this way, the radiation reflected by various regions of the window can be detected individually, in particular independently of the other regions. An evaluation device may be assigned to the sensorially active regions of the radiation receiver and may function to evaluate the radiation received by the sensorially active regions, particularly the detected radiation intensity. By evaluating the various regions of the detection surface independently, it is possible for example to determine the size of a water drop and its position in the detection surface.

In a further development of the method, a determination is made regarding the size and/or position of drops of liquid on the window on the basis of the radiation captured via the various sensorially active regions. The detection surface on the window of the motor vehicle, particularly on the windscreen of the motor vehicle, consists of various radiation focus points, wherein lateral overlapping between neighbouring focus points is possible. The radiation focus points are created by the various lens contours on the radiation inlet side of the guide element. Focussing on the radiation receiver with its various sensorially active regions has the effect of creating substantially individual focus points on the radiation receiver, which represent subregions of the rain detection surface in the windscreen. The focus points on the detector may be evaluated individually, thus enabling an evaluation regarding the position and size of a drop of water within the rain detection surface. An independent evaluation of the focus points for example may also be possible. In this situation, the difference in the coupling out of the light on the windscreen is used for large and small drops and their position. The type of wetness can be classified with statistical analyses.

Figure 2:
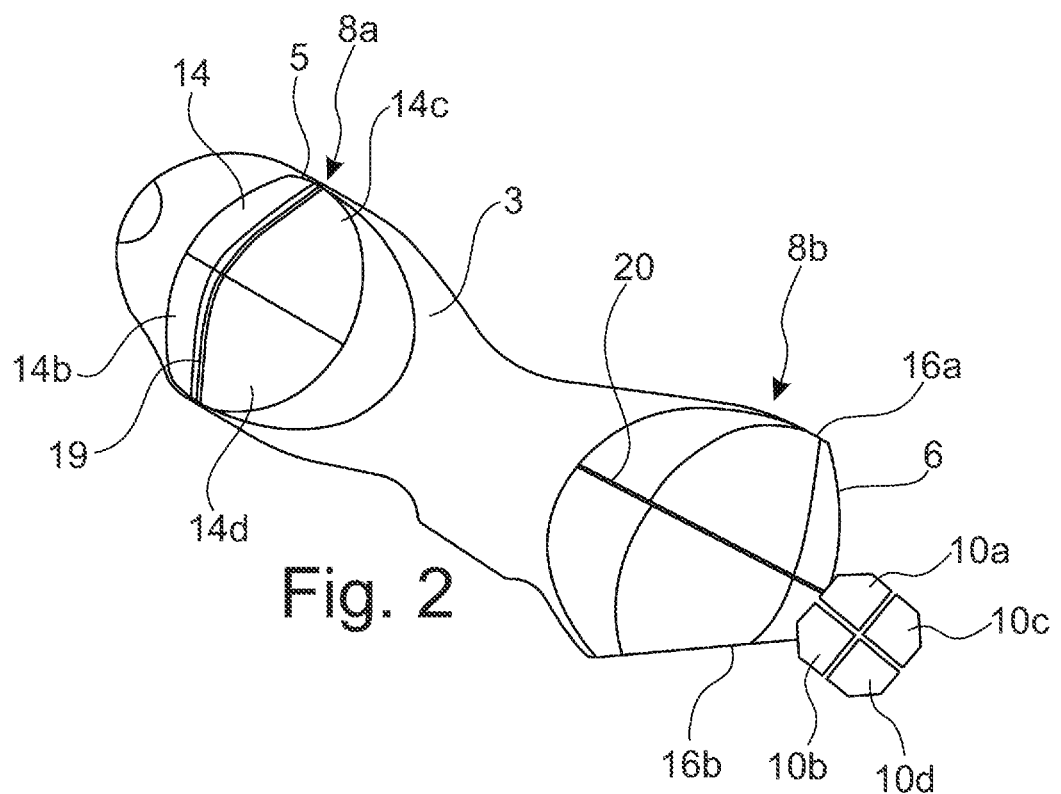
Figure 3:
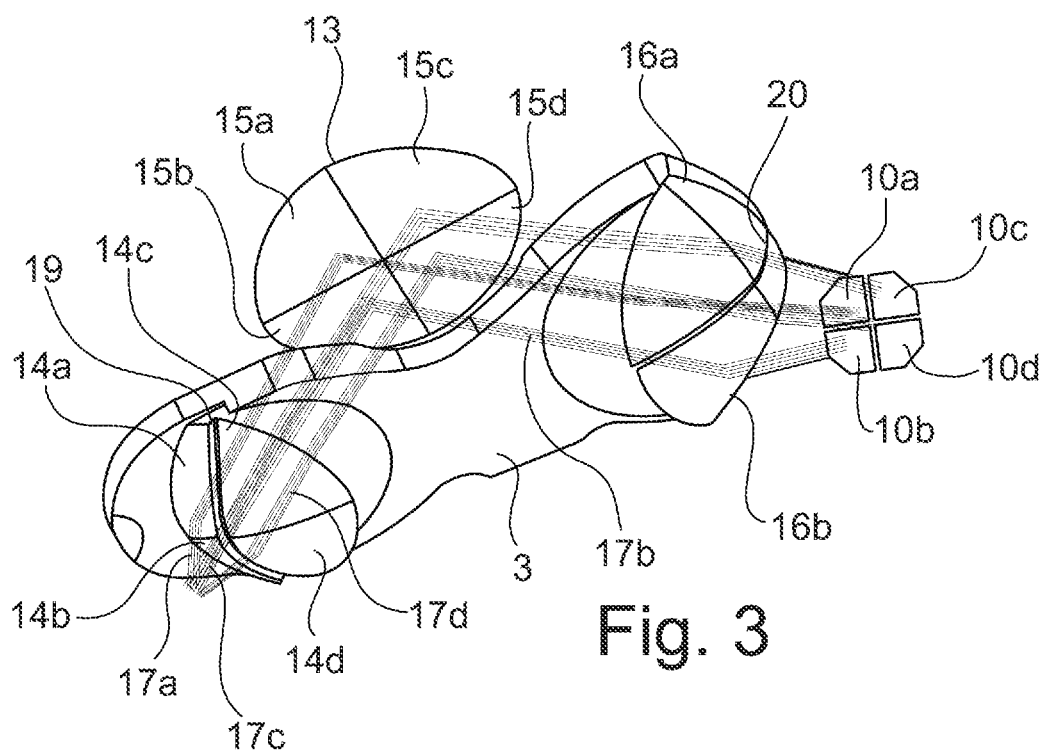
Figure 4:
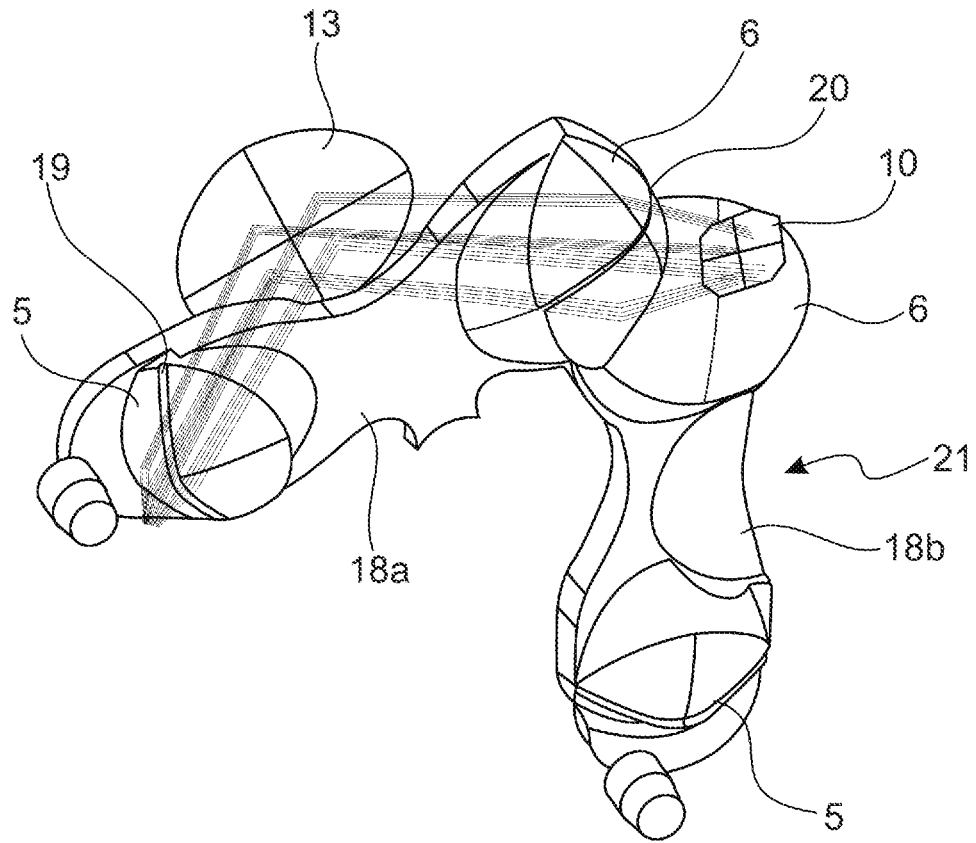

In the following text, the invention will be explained in greater detail with reference to an exemplary embodiment represented in the drawing. Specifically, the schematic representation shows in:

FIG. 1: a partial cutaway view of a sensor apparatus with a guide element;

FIG. 2: a perspective schematic representation of a guide element according to the invention;

FIG. 3: a guide element according to FIG. 2 with beam paths and detection surface; and FIG. 4: a V-shaped guide element with two radiation inlet side and two radiation outlet side.

FIG. 1 represents a sensor apparatus with a radiation emitter 1, a radiation receiver 2 and a guide element 3 for attachment to a windscreen 4. The guide element 3 is constructed as a single element and has a radiation inlet side 5 and a radiation outlet side 6. The radiation inlet side 5 is assigned to the radiation emitter 1, the radiation outlet side 6 is assigned to the radiation receiver 2. The radiation inlet side 5 is constructed as lens arrangement 8a with various lens contours 14a, 14b, 14c, 14d. The radiation outlet side 6 is constructed as lens arrangement 8b with various lens contours 16a, 16b. The radiation inlet side 5 and the radiation outlet side 6 form an acute angle with the plane of the windscreen 4 auf, so that particularly beam sub-bundle 11 of the coupled in radiation is at an acute angle to the windscreen 4. In order to couple the radiation emitted by the radiation emitter 1 into the windscreen, the guide element 3 has a contact surface 7 for mounting on the windscreen 4. In particular, the lens arrangement 8a is formed by lens contours 14a, 14b, 14c, 14d arranged side by side. In particular, the lens contours 14a, 14b, 14c, 14d may be arranged in a grid, for example in rows and columns. The radiation receiver 2 assigned to the radiation outlet side 6 is formed by sensorially active regions 10a, 10b, 10c, 10d that are arranged side by side. In particular, the radiation receiver 2 may be formed by photodiodes arranged side by side or by a pixel array. In particular, the number and arrangement of sensorially active regions 10 may match the number and arrangement of the lens contours 14a, 14b, 14c, 14d of the lens arrangement 8a on the radiation inlet side 5. In this way, the beam path may be routed from the radiation emitter 1 through the radiation inlet side 5 of the guide element 3 so that the radiation is split into beam sub-bundles by the lens contours 14a, 14b, 14c, 14d and the beam sub-bundles are coupled into the windscreen 4. At the same time, the beam path of the radiation emitted by the radiation emitter 1 is widened by the guide element 3 to reach the widest possible detection surface on the windscreen 4, wherein der beam path is only represented in outline. On the outer side of the windscreen 12, that is to say on the side of the windscreen 12 farthest from the guide element 3, total internal reflection takes place, by which the radiation is coupled back into the guide element 3 via the contact surface 7. Through the radiation outlet side 6 of the guide element 3, the radiation is coupled out in the direction of the radiation receiver 2. Through the lens arrangement 8b of the radiation outlet side 6 with the lens contours 16a, 16b, the radiation is focussed on the sensorially active regions 10a, 10b, 10c, 10d of the radiation receiver 2. In particular, in such a case a sensorially active region 10a, 10b, 10c, 10d may be assigned to each lens contour 14a, 14b, 14c, 14d on the radiation inlet side 5. The separate focussing of the emitted radiation by the lens arrangement 8b has the effect of enabling a spatial resolution of the radiation that is reflected in the detection surface. The detection surface is defined by the region on the windscreen 12 in which total internal reflections of the radiation occur, and the detection surface is formed by illumination surfaces of the beam sub-bundles 11. If a raindrop is present on the detection surface, total internal radiation does not take place at these places in the windscreen, instead the radiation 11 will be coupled out of the windscreen 4 in the regions of the detection surface which are wet with water. Thus, in the regions of the detection surface which are wet with raindrops, less reflection of the coupled in radiation 11 takes place, which in turn means that the sensorially active regions assigned to these areas detect less radiation intensity. This enables an exact determination to be made of the position and size of the raindrops on the detection surface and accordingly a more exact determination of the degree of wetness of the entire windscreen 4.

FIG. 2 represents a guide element 3 with a radiation inlet side 5 and a radiation outlet side 6. The radiation inlet side has four separate optical lens contours 14a, 14b, 14c, 14d, wherein the inlet surfaces of lens contours 14a to 14d into the lens medium on the radiation inlet side 5 of the guide element 3 are inclined towards each other by a few degrees in order to split the beam. The lens contours 14a to 14d are connected to form a common lens body. The convex lens contours 14a to 14d on the radiation inlet side 5 guide the light emitted by a radiation source, which enters the guide element 3 at each quadrant 14a to 14d and is refracted there, separately to the outer surface of the windscreen, wherein the entire beam bundle is split into four illumination surfaces, wherein lateral overlaps may exist between adjacent illumination surfaces. The radiation outlet side 6 includes the lens contours 16a, 16b, wherein the separate lens contours 16a, 16b are inclined towards each other by a few degrees in order to bundle the beams. In this situation, lens contour 16a on the radiation outlet side is assigned to the lens contours 14a and 14c on the radiation inlet side, lens contour 16b is assigned to the lens contours 14b and 14d on the radiation inlet side. The radiation inlet side 5 forms a tier 19, which is arranged transversely to the beam path of the radiation which is guided in the guide element 3. The radiation outlet side 6 forms a tier 20 which is aligned parallel to the beam path.

FIG. 3 is a schematic representation of the guide element 3 with a detection surface 13. The light emitted by a radiation source is received through the radiation inlet side 5, and the light is split into sub-bundles 17a, 17b, 17c, 17d by lens contours 14a to 14d. Each sub-bundle 17a to 17d creates an illumination surface 15a to 15d of the detection surface 13 on the windscreen 12. The illumination surfaces 15a, 15b, 15c, 15d form the detection surface 13 on the windscreen, wherein overlap regions may occur between the illumination surfaces 15a, 15b, 15c, 15d. The beam sub-bundles 17a to 17d which have undergone total internal reflection in the illumination surfaces 15a to 15d are focussed on the die sensorially active regions 10a, 10b, 10c, 10d of the radiation receivers 2 by the lens contours 16a, 16b on the radiation outlet side. The division of the detection surface 13 into the illumination surfaces 15a to 15d by the lens contours 14a to 14d makes it possible to examine each instance of coupling that takes place at the illumination surfaces 15a to 15d, This in turn may allow an analysis of the size and spatial position of the water drops present in the detection surface 13 on the windscreen 4.

FIG. 4 represents a guide element 21 with two radiation inlet sides 5 and two radiation outlet sides 6. The guide element 21 is constructed in a V-shape, creating two legs 18a, 18b. The radiation inlet side 5 are arranged on each leg 18a, 18b, whereas the radiation outlet sides 6 are arranged side by side. This results in the creation of two detection surfaces 13, one detection surface 13 being formed by each beam path in the legs 18a, 18b.

The invention claimed is:

1. A sensor apparatus for detecting the wetness of a window, particularly the window of a motor vehicle, with at least one radiation emitter for emitting radiation and with at least one radiation receiver for receiving radiation, with at least one optical guide element which can be coupled to the inner side of the window for guiding the radiation emitted by the radiation emitter,
wherein at least one radiation inlet side of the guide element is assigned to the at least one radiation emitter, and at least one radiation outlet side of the guide element is assigned to the at least one radiation receiver,
wherein the radiation inlet side and the radiation outlet side of the guide element are each embodied as a lens arrangement,
wherein at least one lens arrangement is created by lens contours arranged side by side,
wherein the lens arrangement on the radiation inlet side includes at least two lens contours,
wherein inlet surfaces of the lens contours on the radiation inlet side, through which the radiation can enter the guide element, are inclined towards each other,
wherein the lens arrangement on the radiation outlet side has at least two lens contours,
wherein the outlet surfaces of the lens contours on the radiation outlet side, through which the radiation can exit the guide element, are inclined towards each other, and
wherein the lens arrangements on the radiation inlet side and the radiation outlet side each form at least one tier and that at least one lens contour is arranged on both sides of the tier.

2. The sensor apparatus according to claim 1, wherein at least sections of the lens contours are constructed in the form of convex converging lenses.

3. The sensor apparatus according to claim 1, wherein the lens arrangement on the radiation inlet side includes at least four, particularly exactly four lens contours, and that the inlet surfaces of the lens contours are inclined towards each other.

4. The sensor apparatus according to claim 1, wherein the radiation inlet side two lens contours are arranged on a first side of the tier and two lens contours are arranged on a second side of the tier.

5. The sensor apparatus according to claim 1, wherein one tier is arranged parallel to the direction of radiation guided by the guide element, and that one tier is arranged transversely to the direction of radiation guided by the guide element.

6. The sensor apparatus according to claim 5, wherein the tier formed on the radiation inlet side is arranged transversely to the radiation guided by the guide element, and that the tier formed on the radiation outlet side is arranged parallel to the radiation guided by the guide element.

7. The sensor apparatus according to claim 1, wherein at least one lens arrangement of the guide element is constructed as a single piece.

8. The sensor apparatus according to claim 1, wherein a shared optical guide element is assigned to at least one radiation emitter and at least one radiation receiver.

9. The sensor apparatus according to claim 1, wherein the radiation receiver assigned to the radiation outlet side is formed by an arrangement of sensorially active regions.

10. The sensor apparatus according to claim 9, wherein at least one lens contour of lens arrangement on the radiation inlet side is assigned to each of the sensorially active regions of the radiation receiver.

11. A motor vehicle having a sensor apparatus according to claim 1.

12. A method for detecting the degree of wetness of a window, particularly a window of a motor vehicle, with a sensor apparatus according to claim 1, wherein radiation is emitted by at least one radiation emitter, wherein the radiation emitted is split into beam bundles via at least two, particularly four, lens contours on a radiation inlet side of a guide element that are inclined towards each other and coupled into the guide element, wherein the radiation is coupled into the window by means of the guide element, wherein following total internal reflection in the window the radiation is coupled into the guide element again, wherein the radiation reflected in the window is guided via at least two, particularly exactly two, lens contours that are inclined towards each other of a radiation outlet side of the guide element onto at least one radiation receiver, wherein the radiation receiver has a plurality of, particularly four, sensorially active regions, and wherein beam bundles reflected from different regions of the window are each captured by means of the various sensorially active regions of the radiation receiver.

13. The method according to claim 12, wherein a conclusion is drawn regarding the size and/or position of drops of liquid present on the window from the radiation values captured by means of the various sensorially active regions.

14. A sensor apparatus for detecting the wetness of a window, particularly the window of a motor vehicle, with at least one radiation emitter for emitting radiation and with at least one radiation receiver for receiving radiation, with at least one optical guide element which can be coupled to the inner side of the window for guiding the radiation emitted by the radiation emitter,
wherein at least one radiation inlet side of the guide element is assigned to the at least one radiation emitter, and at least one radiation outlet side of the guide element is assigned to the at least one radiation receiver,
wherein the radiation inlet side and the radiation outlet side of the guide element are each embodied as a lens arrangement,
wherein at least one lens arrangement is created by lens contours arranged side by side,
wherein the lens arrangement on the radiation inlet side includes at least two lens contours,
wherein inlet surfaces of the lens contours on the radiation inlet side, through which the radiation can enter the guide element, are inclined towards each other,
wherein the lens arrangement on the radiation outlet side has at least two lens contours,
wherein the outlet surfaces of the lens contours on the radiation outlet side, through which the radiation can exit the guide element, are inclined towards each other, and
wherein the guide element includes at least two, particularly exactly two inlet regions and at least two, particularly exactly two outlet regions, and that the outlet regions are arranged side by side.

15. The sensor apparatus according to claim 14, wherein the guide element is constructed substantially in a V-shaped form, wherein each leg of the V-shaped form has one radiation inlet side.

* * * * *